(12) United States Patent
Kawahara

(10) Patent No.: US 10,451,157 B2
(45) Date of Patent: Oct. 22, 2019

(54) LOCK-UP DEVICE FOR TORQUE CONVERTER

(71) Applicant: EXEDY Corporation, Neyagawa-shi, Osaka (JP)

(72) Inventor: Yuki Kawahara, Neyagawa (JP)

(73) Assignee: EXEDY CORPORATION, Neyagawa-Shi, Osaka (JP)

( * ) Notice: Subject to any disclaimer, the term of this patent is extended or adjusted under 35 U.S.C. 154(b) by 259 days.

(21) Appl. No.: 15/512,153

(22) PCT Filed: Jan. 23, 2015

(86) PCT No.: PCT/JP2015/051936
§ 371 (c)(1),
(2) Date: Mar. 17, 2017

(87) PCT Pub. No.: WO2016/067639
PCT Pub. Date: May 6, 2016

(65) Prior Publication Data
US 2017/0276223 A1   Sep. 28, 2017

(30) Foreign Application Priority Data

Oct. 29, 2014 (JP) .................................. 2014/220015

(51) Int. Cl.
*F16H 45/02* (2006.01)
*F16D 3/12* (2006.01)
(Continued)

(52) U.S. Cl.
CPC ............... *F16H 45/02* (2013.01); *F16D 3/12* (2013.01); *F16F 15/129* (2013.01);
(Continued)

(58) Field of Classification Search
CPC ..... F16H 2045/0294; F16H 2045/0226; F16H 2045/0205; F16H 2045/0231;
(Continued)

(56) References Cited

U.S. PATENT DOCUMENTS 7,454,902 B2 * 11/2008 Fukunaga ............... F16H 41/26
60/330
7,648,009 B2 * 1/2010 Wack ................ F16F 15/12366
192/213.2
(Continued)

FOREIGN PATENT DOCUMENTS

CN         101349342 A      1/2009
CN         102472378 A      5/2012
(Continued)

OTHER PUBLICATIONS

International Search Report dated Apr. 28, 2015 for corresponding foreign Application No. PCT/JP2015/051936, 1-2 pp.
(Continued)

*Primary Examiner* — Jonathan P Masinick
(74) *Attorney, Agent, or Firm* — United IP Counselors, LLC

(57) ABSTRACT

A lock-up device includes a clutch portion, an intermediate member, a driven plate, a damper portion and a dynamic damper device. The clutch portion is a portion into which a torque is inputted from a front cover. The intermediate member is a member into which the torque is inputted from the clutch portion. The driven plate is rotatable relatively to the intermediate member and is coupled to a turbine hub. The damper portion elastically couples the intermediate member and the driven plate in a rotational direction. The dynamic damper device is mounted to an outer peripheral part of the driven plate and attenuates fluctuation in a rotational speed.

10 Claims, 5 Drawing Sheets

(51) Int. Cl.
  *F16F 15/129* (2006.01)
  *F16F 15/14* (2006.01)
(52) U.S. Cl.
  CPC .. *F16F 15/1421* (2013.01); *F16H 2045/0226* (2013.01); *F16H 2045/0294* (2013.01)
(58) Field of Classification Search
  CPC .... F16H 2045/0278; F16H 45/02; F16D 3/12; F16F 15/129; F16F 15/1421
  See application file for complete search history.

(56) References Cited

U.S. PATENT DOCUMENTS

| | | | | |
|---|---|---|---|---|
| 7,815,027 | B2* | 10/2010 | Matsumoto | F16H 45/02 192/107 R |
| 8,161,740 | B2* | 4/2012 | Krause | F16F 15/145 192/30 V |
| 8,720,658 | B2* | 5/2014 | Ito | F16F 15/145 192/3.29 |
| 2004/0185940 | A1* | 9/2004 | Yamamoto | F16F 15/12366 464/68.4 |
| 2011/0287844 | A1 | 11/2011 | Steinberger | |
| 2013/0206529 | A1 | 8/2013 | Tomiyama | |
| 2014/0008174 | A1* | 1/2014 | Tomiyama | F16H 45/02 192/203 |
| 2015/0023781 | A1* | 1/2015 | Takikawa | F16H 45/02 415/119 |

FOREIGN PATENT DOCUMENTS

| | | |
|---|---|---|
| CN | 103189670 A | 7/2013 |
| DE | 102011101156 A1 | 11/2011 |
| JP | 2000-88083 A | 3/2000 |
| JP | 2012087856 A | 5/2012 |
| JP | 2012207777 A | 10/2012 |
| JP | 2013256963 A | 12/2013 |
| JP | 5555784 B1 | 7/2014 |
| JP | 2014145484 A | 8/2014 |
| WO | 2012053280 A1 | 4/2012 |

OTHER PUBLICATIONS

First Office Action of the corresponding Chinese patent application No. 201580054983.X, dated Aug. 22, 2018, 5 pp.

* cited by examiner

LOCK-UP DEVICE FOR TORQUE CONVERTER

CROSS-REFERENCE TO RELATED APPLICATIONS

This application is the U.S. National Phase of PCT International Application No. PCT/JP2015/051936, filed on Jan. 23, 2015. That application claims priority to Japanese Patent Application. No. 2014-220015, filed Oct. 29, 2014. The contents of both applications are herein incorporated by reference in their entireties.

BACKGROUND

Technical Field

The present disclosure relates to a lock-up device, particularly to a lock-up device for a torque converter, which is disposed between a front cover coupled town engine-side member and a turbine of the torque converter.

Background Art

A torque converter is equipped with a lock-up device in order to reduce fuel consumption. The lock-up device is disposed between a front cover and a turbine, and is configured to mechanically couple the front cover and the turbine in order to directly transmit a torque therebetween.

In general, the lock-up device includes a piston and a damper mechanism including a plurality of torsion springs. The piston is configured to be pressed onto the front cover by the action of hydraulic pressure, whereby a torque is transmitted to the piston from the front cover. Additionally, the piston is elastically coupled to an output-side member coupled to the turbine by the plurality of torsion springs. In the lock-up device as described above, the torque transmitted to the piston is transmitted to the output-side member through the plurality of torsion springs, and is further transmitted to the turbine.

Incidentally, a lock-up device described in Japan Patent No. 5555784 is equipped with a dynamic damper device including an inertia member in order to inhibit fluctuation in engine rotation. In the dynamic damper device described in Japan Patent No. 5555784, a plate is fixed to a turbine shell, and the inertia member is mounted to the plate while being rotatable relatively thereto. Additionally, coil springs are mounted between the plate and the inertia member.

BRIEF SUMMARY

The dynamic damper device described in Japan Patent No. 5555784 is fixed to the turbine shell by welding. Therefore, its relevant manufacturing process has a large number of steps and is therefore complicate. Additionally, increase in number of members composing the dynamic damper device is also inevitable, and this hinders cost reduction.

It is an object of the present disclosure to produce a dynamic damper device with a simple construction, whereby manufacturing cost can be lowered.

A lock-up device for a torque converter according to an aspect of the present disclosure is disposed between a front cover coupled to an engine-side member and a turbine of the torque converter. The present lock-up device includes a clutch portion, an input-side plate, an output-side plate, a damper portion and a dynamic damper device. The clutch portion is a constituent element into which a torque is inputted from the front cover. The input-side plate is a constituent element into which the torque is inputted from the clutch portion. The output-side plate is coupled to the turbine and is configured to be rotatable relatively to the input-side plate. The damper portion elastically couples the input-side plate and the output-side plate in a rotational direction. The dynamic damper device is mounted to an outer peripheral part of the output-side plate, and is configured to attenuate fluctuation in a rotational speed.

In the present device, the torque inputted from the front cover is inputted into the input-side plate through the clutch portion, and is then outputted to the turbine through the damper portion and the output-side plate. The dynamic damper device is mounted to the outer peripheral part of the output-side plate. Fluctuation in rotational speed can be inhibited by the dynamic damper device.

In this construction, the dynamic damper device is mounted to the outer peripheral part of the output-side plate. Hence, it is not required to perform works such as welding the dynamic damper device to the turbine shell. Hence, the construction and the manufacturing process of the present device can be simplified. Additionally, unlike a well-known device, it is not required to prepare a plate as a separate member fixed to the turbine shell. Hence, cost reduction can be achieved.

In a lock-up device for a torque converter according to another aspect of the present disclosure, the output-side plate includes a first plate and a second plate that are coupled to each other while being disposed axially in opposition to each other. The input-side plate is disposed axially between the first plate and the second plate.

In a lock-up device for a torque converter according to yet another aspect of the present disclosure, the dynamic damper device is disposed on an outer peripheral side of a center of a torus of the torque converter.

In general, a relatively large space is formed on an outer peripheral region in the torque converter. Therefore, the present device can be entirely reduced in axial dimension by disposing the dynamic damper device in this space.

In a lock-up device for a torque converter according to yet another aspect of the present disclosure, the dynamic damper device includes a first inertia ring, a second inertia ring, and a plurality of elastic members. The first and second inertia rings are disposed to be rotatable relatively to the output-side plate while axially interposing the outer peripheral part of the output-side plate therebetween. The first and second inertia rings are coupled to each other while being non-rotatable relatively to each other. The plurality of elastic members elastically couple the output-side plate and the first and second inertia rings in the rotational direction.

In this construction, the outer peripheral part of the output-side plate is utilized as part of the dynamic damper device. Hence, as described above, a plate as a separate member is not required unlike the well-known device.

In a lock-up device for a torque converter according to yet another aspect of the present disclosure, the first and second inertia rings include a plurality of windows for accommodating the plurality of elastic members. Each of the plurality of windows includes end surfaces and a restriction part. The end surfaces make contact with both ends of each of the plurality of elastic members in the rotational direction. The restriction part restricts the each of the plurality of elastic members from axially moving.

In this construction, the plurality of elastic members are accommodated in the plurality of windows of the first and second inertia rings. Additionally, the end surfaces of each of the plurality of elastic members make contact with those of each of the plurality of windows. Moreover, the restriction part of each of the plurality of windows restricts each of the plurality of elastic members from axially moving.

In a lock-up device for a torque converter according to yet another aspect of the present disclosure, the plurality of elastic members are coil springs each having a circular-arc shape.

In this construction, the plurality of elastic members of the dynamic damper device are coil springs each having a circular-arc shape (so-called arc springs). Hence, a hysteresis torque can be generated in a relatively low rotational speed range. Therefore, fluctuation in rotational speed can be effectively inhibited even in a low rotational speed range.

In a lock-up device for a torque converter according to yet another aspect of the present disclosure, the plurality of elastic members are disposed on the outer peripheral side of the center of the torus of the torque converter while being disposed in positions axially overlapping with the torus.

In the present device, the plurality of elastic members of the dynamic damper device are disposed in the space located on the outer peripheral side of the torus in the torque converter, and in addition, are disposed in positions axially overlapping with the torus. Hence, the present device can be entirely reduced in axial dimension.

In a lock-up device for a torque converter according to yet another aspect of the present disclosure, the damper portion includes an outer peripheral side damper portion and an inner peripheral side damper portion. The outer peripheral side damper portion includes a plurality of outer peripheral side torsion springs into which the torque is inputted from the front cover. The inner peripheral side damper portion is disposed on the inner peripheral side of the outer peripheral side damper portion, and includes a plurality of inner peripheral side torsion springs configured to transmit the torque to the output-side plate. Additionally, the input-side plate has an annular shape, includes a plurality of outer peripheral side engaging parts on an outer peripheral part thereof, and includes a plurality of inner peripheral side engaging parts on an inner peripheral part thereof. The plurality of outer peripheral side engaging parts are engaged with the plurality of outer peripheral side torsion springs. The plurality of inner peripheral side engaging parts are engaged with the plurality of inner peripheral side torsion springs.

In a lock-up device for a torque converter according to yet another aspect of the present disclosure, at least either the plurality of outer peripheral side torsion springs or the plurality of inner peripheral side torsion springs are coil springs each having a circular-arc shape.

In this construction, at least either the plurality of outer peripheral side torsion springs or the plurality of inner peripheral side torsion springs each have a circular-arc shape. Hence, lowering of a stiffness in torsional characteristics and widening of a torsion angle can be achieved.

A lock-up device for a torque converter according to yet another aspect of the present disclosure further includes a drive plate that is fixed to the front cover, is partially engaged with the plurality of outer peripheral side torsion springs, and is configured to transmit the torque from the front cover to the plurality of outer peripheral side torsion springs.

As described above, according to the present disclosure, a dynamic damper device for a lock-up device can be realized with a simple construction at a lowered manufacturing cost.

DETAILED DESCRIPTION OF EMBODIMENTS

Practical Example 1

[Entire Construction]

Figure 1:
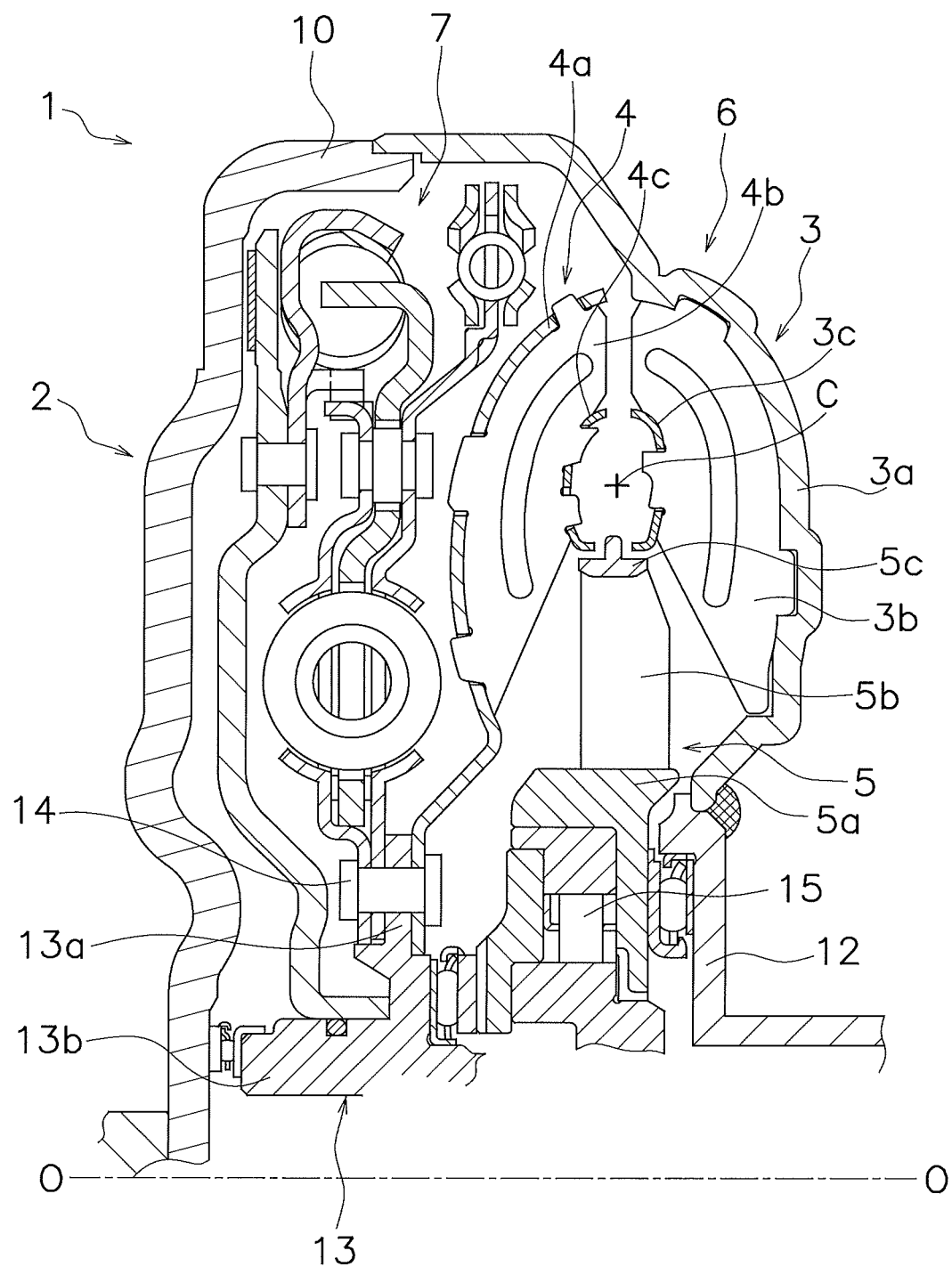
FIG. 1 is a cross-sectional view of a construction of a torque converter according to an exemplary embodiment of the present disclosure.

FIG. 1 shows a torque converter 1 according to an exemplary embodiment of the present disclosure. In FIG. 1, an engine is disposed on the left side, whereas a torque converter and a transmission are disposed on the right side. Line O-O depicted in FIG. 1 is a rotational axis of the torque converter.

The torque converter 1 is a device configured to transmit a torque from an engine-side crankshaft (not shown in the drawings) to an input shaft of the transmission. The torque converter 1 includes a front cover 2 fixed to an engine-side member, a torque converter body 6 composed of a three types of vane wheels (an impeller 3, a turbine 4 and a stator 5), and a lock-up device 7.

The front cover 2 is a disc-shaped member and is provided with an outer peripheral tubular part 10 as its outer peripheral part. The outer peripheral tubular part 10 protrudes toward the transmission. The impeller 3 includes an impeller shell 3a, a plurality of impeller blades 3b, and a core 3c. The impeller shell 3a is fixed to the outer peripheral tubular part 10 of the front cover 2 by welding. The plurality of impeller blades 3b are fixed to the inside of the impeller shell 3a. The core 3c supports the plurality of impeller blades 3b. Additionally, the impeller 3 includes an impeller hub 12 mounted to the inner peripheral side of the impeller shell 3a.

The turbine 4 is disposed in opposition to the impeller 3 within a fluid chamber. The turbine 4 includes a turbine shell 4a, a plurality of turbine blades 4b fixed to the inside of the turbine shell 4a, and a core 4c supporting the plurality of turbine blades 4b. Additionally, the turbine 4 includes a turbine hub 13 fixed to the inner peripheral side of the turbine shell 4a. The turbine hub 13 includes a flange 13a extending to the outer peripheral side and a tubular part 13b extending to the engine side. The inner peripheral part of the turbine shell 4a is fixed to the flange 13a of the turbine hub 13 by a plurality of rivets 14. Additionally, the input shaft of the transmission (not shown in the drawings) is spline-coupled to the inner peripheral part of the turbine hub 13.

The stator 5 is a mechanism configured to regulate the flow of hydraulic oil returning from the turbine 4 to the impeller 3, and is disposed between the inner peripheral part of the impeller 3 and that of the turbine 4. The stator 5 mainly includes a stator carrier 5a, a plurality of stator blades 5b mounted to the outer peripheral surface of the stator carrier 5a, and a core 5c provided on the outer peripheral parts of the stator blades 5b. The stator carrier 5a is supported by a stationary shaft (not shown in the drawings) through a one-way clutch 15.

It should be noted that in FIG. 1, the center of a torus is indicated by reference sign "C". The center C of the torus corresponds to the center of a space enclosed by the respective cores 3c, 4c and 5c of the impeller 3, the turbine 4 and the stator 5.

[Entire Construction of Lock-up Device 7]

Figure 2:
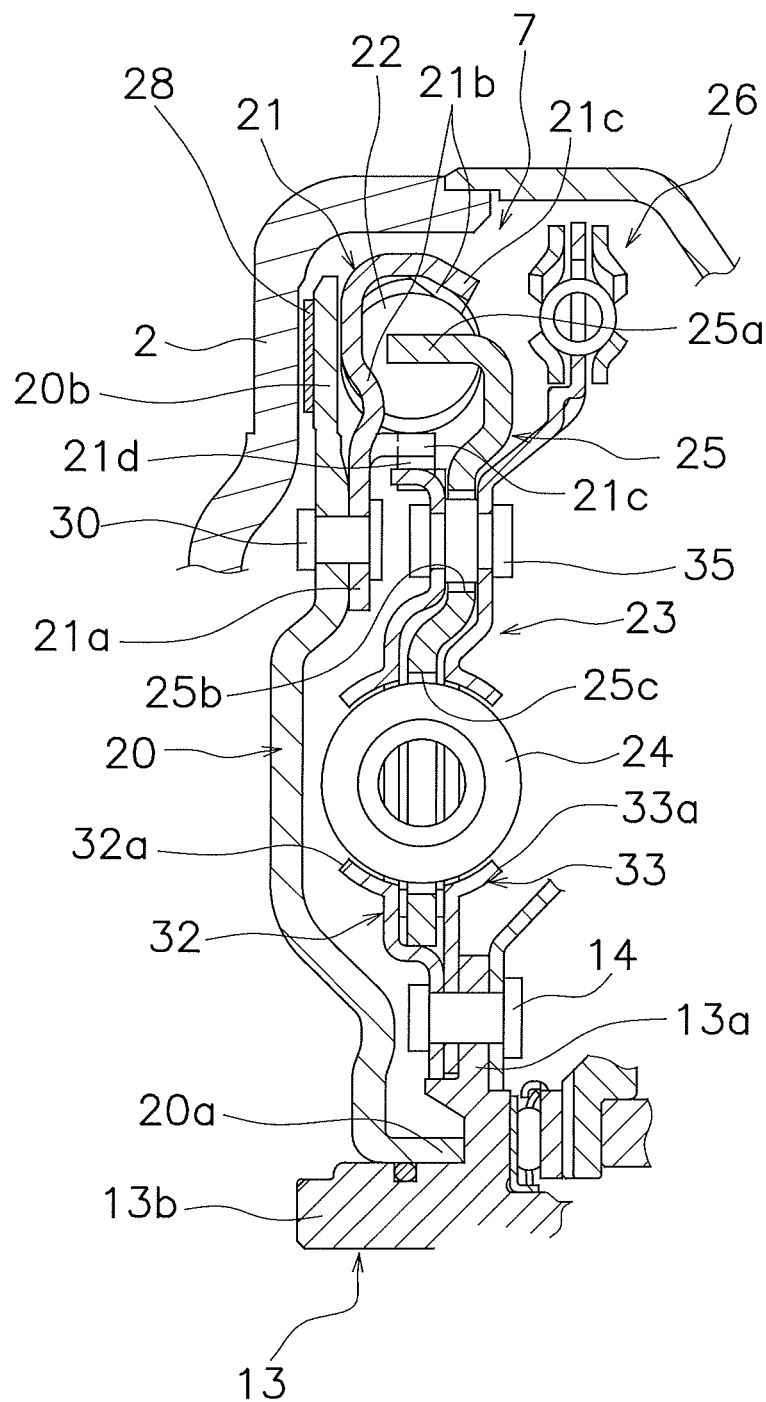
FIG. 2 is a diagram showing a lock-up device extracted from FIG. 1.

FIG. 2 shows the lock-up device 7 extracted from FIG. 1. The lock-up device 7 is disposed in a space between the front cover 2 and the turbine 4. The lock-up device 7 includes a piston 20, a drive plate 21, a plurality of outer peripheral side torsion springs 22 (outer peripheral side damper portions), a driven plate 23 (a pair of output-side plates), a plurality of inner peripheral side torsion springs 24 (inner peripheral side damper portions), an intermediate member 25 (input-side plate) and a dynamic damper device 26.

[Piston 20]

The piston 20 is a disc-shaped plate and is disposed on the transmission side of the front cover 2. The piston 20 is provided with a tubular part 20a on its inner peripheral end. The tubular part 20a extends to the transmission side. The tubular part 20a of the piston 20 is supported by the outer peripheral surface of the tubular part 13b of the turbine hub 13 so as to be movable in the axial direction and be rotatable relatively thereto. Additionally, the piston 20 is provided with a flat part 20b as its outer peripheral part. A friction member 28, having an annular shape, is fixed to the front cover 2-side surface of the flat part 20b. When the friction member 28 is pressed onto the front cover 2, a torque is configured to be transmitted from the front cover 2 to the piston 20. In other words, the piston 20 and the friction member 28 compose a clutch portion.

[Drive Plate 21]

The drive plate 21 is fixed to the transmission-side lateral surface of the outer peripheral part of the piston 20. Specifically, the drive plate 21 has a disc shape and is fixed at its inner peripheral part 21 to the transmission-side surface of the piston 20 by rivets 30.

As shown in FIG. 2, the drive plate 21 is provided with a plurality of engaging parts 21b in its outer peripheral region. Each engaging part 21b includes a part formed by stamping an intermediate part of the drive plate 21 to the transmission side and a part formed by bending the outer peripheral edge of the drive plate 21 to the transmission side and the inner peripheral side. The engaging parts 21b are engaged with both circumferential ends of the respective outer peripheral side torsion springs 22.

It should be noted that the drive plate 21 is provided with spring support parts 21c in its region other than the region that the engaging parts 21b are provided. The spring support parts 21c are formed by bending the outer peripheral part and the radially intermediate part of the drive plate 21 to the transmission side, and support the outer peripheral side torsion springs 22 from the outer peripheral side and the inner peripheral side.

One of the spring support parts 21c, supporting the outer peripheral side torsion springs 22 from the inner peripheral side, is partially provided with a plurality of contact parts 21d functioning as a stopper. The contact parts 21d are formed by bending part of this spring support part 21c to the inner peripheral side.

[Outer Peripheral Side Torsion Springs 22]

Each of the plurality of outer peripheral side torsion springs 22 is an arc spring having a circular-arc shape. In more detail, when in a free state without being assembled in the lock-up device 7, each outer peripheral side torsion spring 22 maintains the circular-arc shape.

Arc springs are herein provided as the outer peripheral side torsion springs 22. Hence, when activated, the outer peripheral side torsion springs 22 relatively strongly make contact with the outer peripheral side one of the spring support parts 21c of the drive plate 21. Therefore, a relatively large hysteresis torque is produced between the outer peripheral side torsion springs 22 and the drive plate 21.

[Driven Plate 23]

The driven plate 23 includes a first plate 32 disposed on the engine side and a second plate 33 disposed on the transmission side. Each of the first plate 32 and the second plate 33 has a disc shape.

The inner peripheral parts of the first plate 32 and the second plate 33 are fixed to the flange 13a of the turbine hub 13 by the rivets 14. Additionally, the outer peripheral parts of both plates 32 and 33 are fixed at a predetermined axial interval by stop pins 35. In other words, the first plate 32 and the second plate 33 are disposed in opposition at an axial interval except for their inner peripheral parts fixed to each other. Both plates 32 and 33 are herein non-rotatable relatively to the turbine hub 13 and are axially immovable.

The first plate 32 and the second plate 33 are provided with windows 32a and windows 33a in their radially intermediate parts, respectively. The outer peripheral edge and the inner peripheral edge of each window 32a, 33a are cut and raised axially outside. The inner peripheral side torsion springs 24 are restricted from moving in the axial direction and the radial direction by the windows 32a and 33a.

[Inner Peripheral Side Torsion Springs 24 and Intermediate Member 25]

The intermediate member 25 is disposed axially between the drive plate 21 and the turbine 4, while being disposed axially between the first plate 32 and the second plate 33. The intermediate member 25 is a member into which a torque is inputted from the front cover 2 through the drive plate 21 and the outer peripheral side torsion springs 22. The intermediate member 25 is rotatable relatively to the drive plate 21 and the driven plate 23.

The intermediate member 25 is an annular plate-shaped member and includes a plurality of outer peripheral side engaging parts 25a, a plurality of elongated holes 25b and a plurality of openings 25c (inner peripheral side engaging part) for accommodating springs.

The outer peripheral side engaging parts 25a are provided on the outer peripheral end of the intermediate member 25, while being circumferentially aligned at predetermined intervals. The outer peripheral side engaging parts 25a are formed by bending the outer peripheral end of the intermediate member 25 to the engine side. Each outer peripheral side engaging part 25a is disposed between adjacent two of the outer peripheral side torsion springs 22, and is engaged with a one-side end of one of the adjacent two outer peripheral side torsion springs 22 and an other-side end of the other of the adjacent two outer peripheral side torsion springs 22.

The plurality of elongated holes 25b are provided on the inner peripheral side of the outer peripheral side engaging parts 25a, while being circumferentially aligned at predetermined intervals. Each elongated hole 25b is circumferentially elongated and has a circular-arc shape. The stop pins 35 penetrate the elongated holes 25b, respectively. Therefore, the driven plate 23 and the intermediate member 25 are configured to be rotatable relatively to each other as long as each stop pin 35 is movable in the interior of each elongated hole 25b. In other words, the driven plate 23 and the intermediate member 25 are configured to be prevented from rotating relatively to each other when each stop pin 35 makes contact with either of the end surfaces of each elongated hole 25b.

The plurality of openings 25c are provided on the further inner peripheral side of the elongated holes 25b, while being circumferentially aligned at predetermined intervals. The inner peripheral side torsion springs 24 are accommodated in the openings 25c, respectively. The end surfaces of each opening 25c function as the inner peripheral side engaging part configured to make contact with the end surfaces of each inner peripheral side torsion spring 24.

[Stopper Mechanism]

Figure 3:
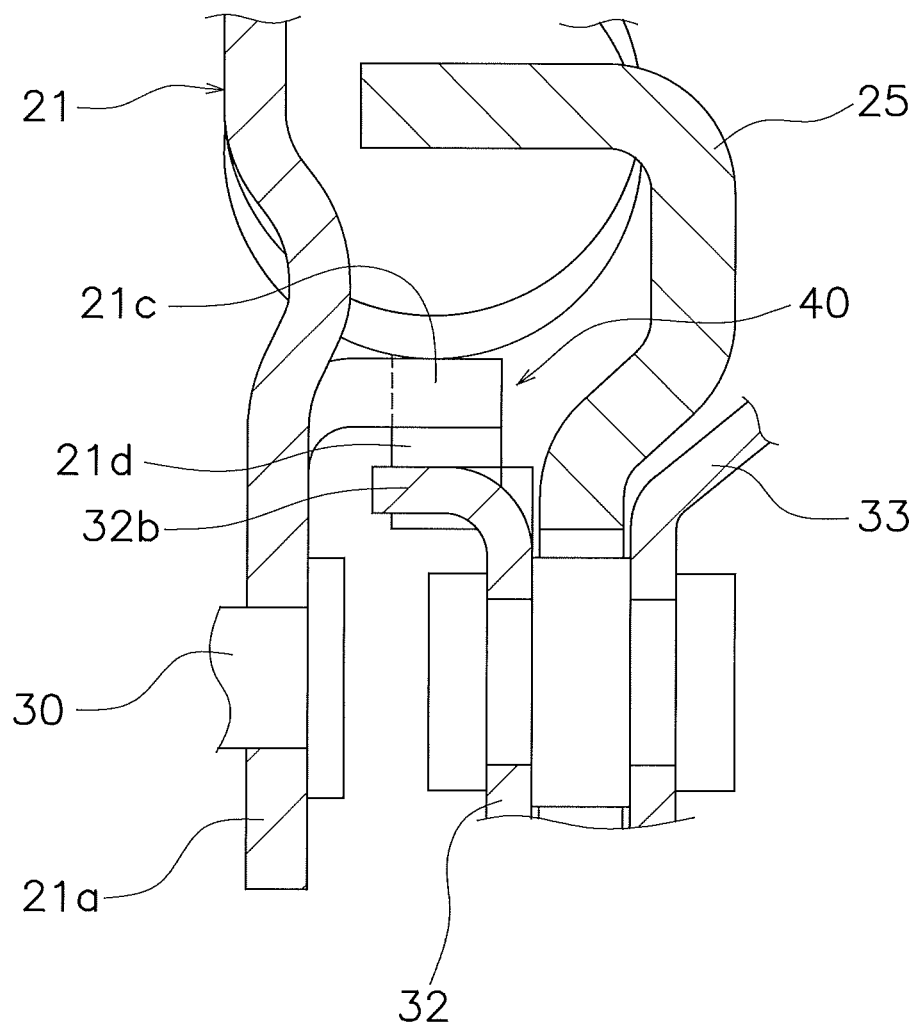
FIG. 3 is a cross-sectional view of a construction of a stopper mechanism.

The lock-up device 7 includes a stopper mechanism 40 for restricting relative rotation between the drive plate 21 and the driven plate 23 (specifically, the first plate 32) to a predetermined rotational angle. As shown in an enlarged view of FIG. 3, the stopper mechanism 40 includes the contact parts 21d provided on part of the inner peripheral side spring support part 21c of the drive plate 21 and stopper pawls 32b provided on the outer peripheral end of the first plate 32 composing the driven plate 23. The contact parts 21d and the stopper pawls 32b are provided in positions radially overlapping with each other.

As described above, the contact parts 21d are formed by bending part of the inner peripheral side spring support part 21c to the inner peripheral side. The contact parts 21d are circumferentially provided at predetermined intervals. Therefore, the drive plate 21 and the driven plate 23 are configured to be rotatable relatively to each other as long as each stopper pawl 32b is movable between adjacent two of the contact parts 21d. In other words, both plates 21 and 23 are configured to be prevented from rotating relatively to each other when each stopper pawl 32b makes contact with either of the adjacent two contact parts 21d.

[Dynamic Damper Device 26]

Figure 4:
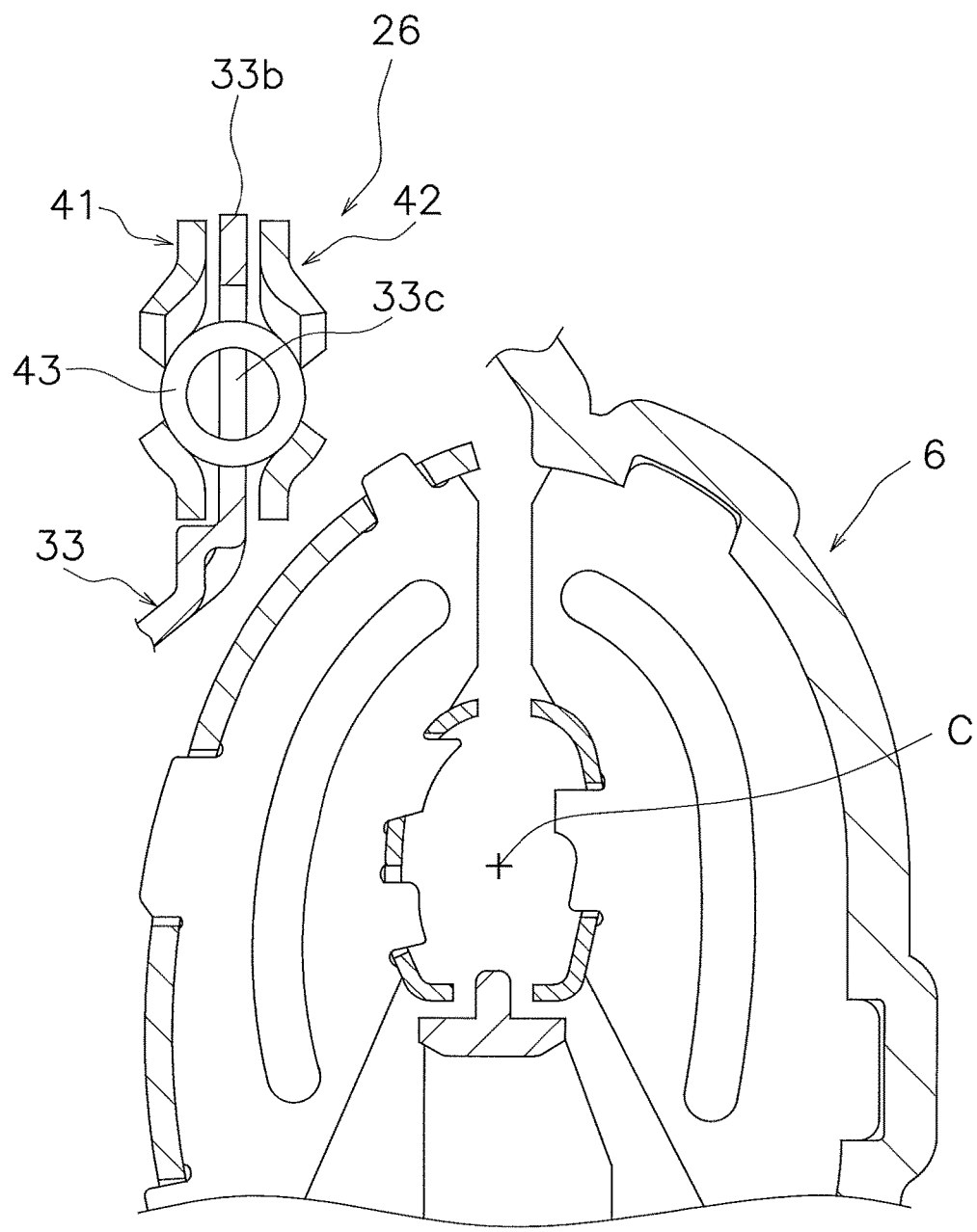
FIG. 4 is a diagram showing a dynamic damper device extracted from FIG. 1.

The dynamic damper device 26 is provided on the outer peripheral part of the second plate 33 composing the driven plate 23. As shown in FIG. 4, the dynamic damper device 26 includes a first inertia ring 41, a second inertia ring 42 and a plurality of coil springs 43 (elastic members).

The second plate 33 extends to the further outer peripheral side than the outer periphery of the turbine 4. Additionally, the second plate 33 is provided with a flat part 33b as its outer peripheral part. The flat part 33b is offset from the other part of the second plate 33 to the transmission side. Moreover, the flat part 33b is provided with openings 33c aligned at predetermined intervals in the circumferential direction.

Figure 5:
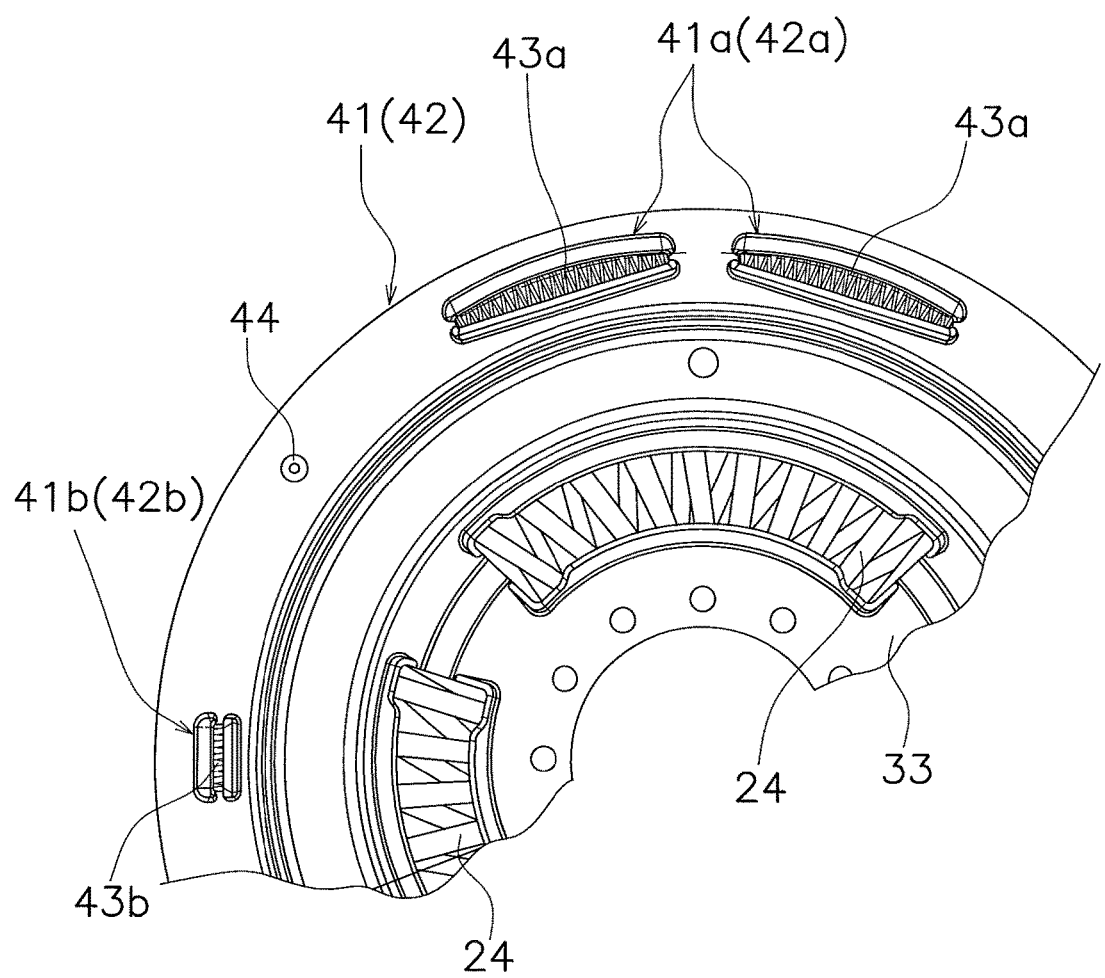
FIG. 5 is a partial front view of the dynamic damper device.

The first inertia ring 41 and the second inertia ring 42 are disposed to be rotatable relatively to the second plate 33, while axially interposing the flat part 33b of the second plate 33 therebetween. As shown in FIG. 5, the first inertia ring 41 and the second inertia ring 42 are fixed to each other by rivets 44 at parts not overlapping with the openings 33c. Therefore, the first inertia ring 41 and the second inertia ring 42 are non-rotatable relatively to each other, and are also immovable relatively to each other in the axial direction.

The first inertia ring 41 and the second inertia ring 42 have the same shape. Specifically, the first and second inertia rings 41 and 42 are made in the shape of an annular plate. As shown in FIG. 5, each inertia ring 41, 42 includes four large windows 41a, 42a and two small windows 41b, 42b. Two pairs of large windows 41a and 42a are disposed in opposition to the other two pairs through the rotational axis, while one pair of small windows 41b and 42b is disposed in opposition to the other pair through the rotational axis.

Each pair of large windows 41a and 42a accommodates a large coil spring 43a having a relatively long spring length. On the other hand, each pair of small windows 41b and 42b accommodates a small coil spring 43b having a shorter spring length than the large coil spring 43a. The large coil springs 43a and the small coil springs 43b are arc springs, each having a circular-arc shape in a free state.

It should be noted that each window 41a, 42a, 41b, 42b makes contact at its both ends with both ends of its relevant coil spring 43a, 43b. Additionally, the outer peripheral edge and the inner peripheral edge of each window 41a, 42a, 41b, 42b are cut and raised axially outside. The cut-and-raised parts restrict radial and axial movements of each large coil spring 43a or each small coil spring 43b accommodated in each window 41a, 42a, 41b, 42b.

As is obvious from FIG. 4, the coil springs 43 are disposed on the outer peripheral side of the center C of the torus of the torque converter body 6. Additionally, the coil springs 43 are disposed in positions axially overlapping with the torus.

[Actions]

In a clutch-off state that the lock-up device 7 is not being actuated, a torque from the engine is transmitted from the front cover 2 to the impeller 3. The hydraulic oil, driven by the impeller blades 3b of the impeller 3, rotates the turbine 4. The torque of the turbine 4 is transmitted to the input shaft of the transmission (not shown in the drawings) through the turbine hub 13.

When the speed of a vehicle becomes a predetermined value or greater, the piston 20 is moved toward the front cover 2, and the friction member 28 is pressed onto the friction surface of the front cover 2. Accordingly, a clutch-on state is made, and the torque from the front cover 2 is transmitted from the piston 20 to the outer peripheral side torsion springs 22 through the drive plate 21. The torque, transmitted to the outer peripheral side torsion springs 22, is transmitted to the inner peripheral side torsion springs 24 through the intermediate member 25. The torque, transmitted to the inner peripheral side torsion springs 24, is transmitted to the turbine hub 13 through the driven plate 23.

[Actions of Dynamic Damper Device 26]

The dynamic damper device 26 is actuated by the rotation of the driven plate 23, and fluctuation in rotational speed of the engine is inhibited by the action of the dynamic damper device 26. In other words, rotation of the second plate 33 composing the driven plate 23 and that of the first and second inertia rings 41 and 42 are displaced in phase by the action of the coil springs 43. Specifically, in a predetermined engine speed, the rotational speed of the first and second inertia rings 41 and 42 fluctuates in phase whereby fluctuation in rotational speed of the driven plate 23 including the second plate is canceled out. Fluctuation in rotational speed of the transmission can be absorbed by this phase displacement.

Arc springs are herein employed as the coil springs 43 of the dynamic damper device 26. With this construction, a relatively large hysteresis torque is generated in the dynamic damper device 26. Therefore, it is possible to lower the resonance peak generated by the dynamic damper device as much as possible.

Other Exemplary Embodiments

The present disclosure is not limited to the aforementioned preferred embodiment, and a variety of changes or modifications can be made without departing from the scope of the present disclosure.

(a) In the aforementioned exemplary embodiment, arc springs are employed as both of the outer peripheral side torsion springs and the inner peripheral side torsion springs. However, these torsion springs are not particularly limited to the arc springs.

(b) In the aforementioned exemplary embodiment, the construction employing both of the outer peripheral side torsion springs and the inner peripheral side torsion springs has been explained. However, the present disclosure is similarly applicable to a construction employing either of them.

(c) In the aforementioned exemplary embodiment, the friction member is mounted to the front cover side surface of the piston. However, the present disclosure is also similarly applicable to a device that is equipped with a clutch portion composed of a plurality of friction members and is configured to transmit a torque from a front cover to torsion springs through the clutch portion.

REFERENCE SIGNS LIST

1 Torque converter
2 Front cover
3 Impeller
4 Turbine
7 Lock-up device
20 Piston
21 Drive plate
22 Outer peripheral side torsion spring
23 Driven plate
25 Intermediate member
26 Dynamic damper device
28 Friction member
32 First plate
33 Second plate
41 First inertia ring
42 Second inertia ring
43 Coil spring

The invention claimed is:

1. A lock-up device for a torque converter, the lock-up device disposed between a front cover coupled to an engine-side member and a turbine of the torque converter, the lock-up device comprising:
    a clutch portion into which a torque is inputted from the front cover;
    an input-side plate into which the torque is inputted from the clutch portion;
    an output-side plate coupled to the turbine, the output-side plate rotatable relative to the input-side plate;
    a damper portion including an outer peripheral side damper portion and an inner peripheral side damper portion that elastically couple the input-side plate and the output-side plate in a rotational direction; and
    a dynamic damper device mounted to an outer peripheral part of the output-side plate, the dynamic damper device configured to attenuate fluctuation in a rotational speed;
    wherein the input-side plate is a single plate that is engaged with the outer peripheral side damper portion and the inner peripheral side damper portion.

2. The lock-up device according to claim 1, wherein the output-side plate includes a first plate and a second plate, the first and second plates coupled to each other and are disposed axially in opposition to each other, and the input-side plate is disposed axially between the first plate and the second plate.

3. The lock-up device according to claim 1, wherein the dynamic damper device is disposed on an outer peripheral side of a center of a torus of the torque converter.

4. The lock-up device according to claim 1, wherein the outer peripheral side damper portion includes a plurality of outer peripheral side torsion springs into which the torque is inputted from the front cover, and the inner peripheral side damper portion is disposed on an inner peripheral side of the outer peripheral side damper portion, the inner peripheral side damper portion including a plurality of inner peripheral side torsion springs, the plurality of inner peripheral side torsion springs to transmit the torque to the output-side plate, and
    the input-side plate has an annular shape, the input-side plate including a plurality of outer peripheral side engaging parts on an outer peripheral part thereof, the input-side plate including a plurality of inner peripheral side engaging parts on an inner peripheral part thereof, the plurality of outer peripheral side engaging parts engaged with the plurality of outer peripheral side torsion springs, the plurality of inner peripheral side engaging parts engaged with the plurality of inner peripheral side torsion springs.

5. A lock-up device for a torque converter, the lock-up device disposed between a front cover coupled to an engine-side member and a turbine of the torque converter, the lock-up device comprising:
    a clutch portion into which a torque is inputted from the front cover;
    an input-side plate into which the torque is inputted from the clutch portion;
    an output-side plate coupled to the turbine, the output-side plate rotatable relative to the input-side plate;
    a damper portion elastically coupling the input-side plate and the output-side plate in a rotational direction; and
    a dynamic damper device mounted to an outer peripheral part of the output-side plate, the dynamic damper device configured to attenuate fluctuation in a rotational speed,
    wherein the dynamic damper device includes
    a first inertia ring and a second inertia ring, the first and second inertia rings rotatable relative to the output-side plate while axially interposing the outer peripheral part of the output-side plate therebetween, the first and second inertia rings coupled to each other and non-rotatable relative to each other, and
    a plurality of elastic members elastically coupling the output-side plate and the first and second inertia rings in the rotational direction.

6. The lock-up device according to claim 5, wherein the first and second inertia rings include a plurality of windows for accommodating the plurality of elastic members, and
    each of the plurality of windows includes end surfaces and a restriction part, the end surfaces making contact with both ends of each of the plurality of elastic members in the rotational direction, the restriction part restricting each of the plurality of elastic members from axially moving.

7. The lock-up device according to claim 5, wherein the plurality of elastic members are coil springs each having a circular-arc shape.

8. The lock-up device according to claim 5, wherein the plurality of elastic members are disposed on an outer peripheral side of a center of a torus of the torque converter and are disposed in positions axially overlapping with the torus.

9. The lock-up device according to claim 4, wherein at least either the plurality of outer peripheral side torsion springs or the plurality of inner peripheral side torsion springs are coil springs each having a circular-arc shape.

10. The lock-up device according to claim 4, further comprising:
  a drive plate fixed to the front cover, the drive plate partially engaged with the plurality of outer peripheral side torsion springs, the drive plate configured to transmit the torque from the front cover to the plurality of outer peripheral side torsion springs.

\* \* \* \* \*